United States Patent [19]

Carrier et al.

[11] Patent Number: 4,573,316
[45] Date of Patent: Mar. 4, 1986

[54] INTEGRATED WEATHERSEAL/IGNITER FOR SOLID ROCKET MOTOR

[75] Inventors: Christian J. L. Carrier; Charles J. Shea, both of Ste-Foy, Canada

[73] Assignee: Her Majesty the Queen in right of Canada, as represented by the Minister of National Defence of Her Majesty's Canadian Government, Ottawa, Canada

[21] Appl. No.: 579,205

[22] Filed: Feb. 10, 1984

[30] Foreign Application Priority Data

Mar. 16, 1983 [CA] Canada ................................... 423718

[51] Int. Cl.⁴ ............................................... F02K 9/95
[52] U.S. Cl. ................................... 60/39.823; 60/256; 102/380
[58] Field of Search ............................. 60/39.823, 256; 89/1.813, 1.814; 102/202, 205, 380

[56] References Cited

U.S. PATENT DOCUMENTS

| 3,129,561 | 4/1964 | Priapi | 60/39.823 |
| 3,482,518 | 12/1969 | Sweetman | 102/205 |
| 4,023,497 | 5/1977 | Morris et al. | 60/256 |
| 4,232,843 | 11/1980 | Clark et al. | 60/256 |

Primary Examiner—Louis J. Casaregola
Attorney, Agent, or Firm—Leonard Bloom

[57] ABSTRACT

A low cost easily installed and reliable weather seal for the nozzle throat of a solid propellant rocket motor which uses an aft end ignition system. The igniter cartridge, known per se, which is located in the throat of the rocket motor is provided with an elastomeric O-ring in the base of the cartridge thus sealing the gap between it and the inside surface of the exit cone of the nozzle. This structure not only provides an effective weatherseal but also provides a convenient means of positively retaining the igniter cartridge in place.

7 Claims, 3 Drawing Figures

INTEGRATED WEATHERSEAL/IGNITER FOR SOLID ROCKET MOTOR

BACKGROUND OF THE INVENTION

This invention relates generally to an improved igniter for a rocket motor having a single-port nozzle and wherein, owing to technical requirements, ignition must be achieved from the aft-end of the motor.

An igniter typically consists of a pyrotechnic charge housed in a container together with a squib or ignition cap. The squib is detonated using an electric current, the energy released by the squib igniting the pyrotechnic charge, which in turn uniformly ignites the entire exposed surface of the propellant disposed within the rocket motor body.

Rockets for use in military operations must be capable of providing reliable performance even though the igniter may be subjected to a wide variety of environmental extremes. The aft or nozzle-end ignition system must ignite the rocket motor reliably, without ignition spikes or hangfires, over a temperature range of approximately −65° F. to 150° F. The pyrotechnic charge must not be allowed to crack or fragment when subjected to vibration or thermal shocks, and the igniter must be installed as an integral part of the rocket yet after ignition produce only a relatively small lightweight ejecta fragments.

Prior to the development of the aft-end ignition system for rocket motors as described in Canadian Patent No. 1,036,419 granted Aug. 15th, 1978 and naming Ellas P. Morris and Fred A. Christie as joint inventors, the great majority of rocket motors were ignited using igniters fixed to the head end of the rocket motor. These particular systems, and the few types of aft-end ignition systems available before that time were incapable of meeting the design requirements mentioned above while at the same time being acceptable for aircraft launching, it being kept in mind that the ejection of large pieces of material during ignition could damage the rocket or the following aircraft or cause unstable combustion and consequently elevated operating pressures. There are also the requirement that the rocket unit be self-contained, of relatively small diameter and relatively inexpensive to construct.

The various requirements outlined above are substantially satisified by the aft-end ignition system set forth in the above Canadian Patent No. 1,036,419. Basically, this system uses a lightweight igniter having a breakable plastic casing which is positioned in the throat of the rocket motor nozzle. The igniter casing is provided with retaining means arranged such that during the detonation of the ignition squib or cap, the igniter is first held in place and then is permitted to move outwardly of the nozzle throat with the retaining means acting on the igniter casing so as to cause the latter to break into fragments with the result being that the igniter totally collapses and is ejected from the rocket motor in relatively small pieces thus avoiding danger to any following aircraft as well as avoiding disturbances in the operation of the rocket motor.

While the aft-end ignition system described in the above Canadian patent has proven to be very successful, one potential problem area remains, this being the provision of an effective weather seal between the igniter body and the nozzle of the rocket motor. It is very important that an effective moisture-proof seal be provided which will prevent moisture from passing between the nozzle throat and the igniter and entering into and dampening the propellant and the ignition charge disposed within the rocket body. Any significant degree of moisture will impair the burning characteristics of the propellant and/or the ignition charge and, in severe cases, will cause the rocket motor to hand fire or fail to ignite altogether.

From all of the methods and means available to provide a weather seal for the rocket motor, two were previously used with some degree of success. The first system involved the use of a rubber diaphragm which was positioned within the rocket nozzle expansion cone with its central portions overlying the rearwardly extending face of the igniter and its side walls overlying the adjacent portions of the nozzle expansion cone. The ignition wires for the squib are passed through a small aperture in the center of the diaphragm. An adhesive material was used to bond the diaphragm to the wall of the nozzle and to the end portions of the igniter.

The second weather seal which was developed involves bonding the end portions of the igniter to a conical foam plug shaped so as to snugly fit into the nozzle expansion cone. The adhesive materials held to secure this form plug in position. A relatively wide passageway was left to accommodate the squib ignition wires. The final sealing was accomplished by the use of a silicone potting compound, which compound completely filled the above-noted passageway as well as covering the entire exposed end of the form plug.

Both of the above-noted weather seal designs had certain limitations. Although the rubber diaphragm arrangement provided an adequate seal when properly bonded, actual production line conditions often introduced wide variations in some important process parameters such as the amount of adhesive applied, the surface treatment of the adherents, and in the manner of application of the adhesive etc. Accordingly, the strength of the diaphragm-to-nozzle bond was often poor and the bond line discontinuous and hence the resulting assembly was prone to leakage.

The silicone potted foam plug arrangement also involves adhesives, treatment of surfaces, etc. and is susceptible to essentially the same problems in actual production line conditions as is the diaphragm arrangement. Moreover, because the potted foam plug is relatively massive, it tends to induce an overpressure in the rocket motor immediately after ignition.

SUMMARY OF THE INVENTION

It is a basic object to provide a low-cost easily installed igniter having a reliable weather seal arrangement for use in the nozzle throat of a solid propellant rocket motor which uses an aft-end ignition system It is a further object of the present invention to provide an improved igniter for use in a solid propellant rocket motor, which igniter incorporates an effective weather sealing arrangement which does not require the use of adhesives, potting compounds or the like.

Accordingly, the present invention in one aspect provides an improved igniter adapted to be positioned in the throat of the nozzle of a rocket motor, such rocket motor nozzle including a first surface converging toward the throat and a second surface or expansion cone diverging away from the throat in a direction toward the exit end of the motor. The igniter includes a cylindrical tube having a closed end, such tube adapted to be located in the nozzle throat with the closed end facing the above-noted motor exit end. An electrically activated igniter squib is mounted in the tube at the closed end of same. An ignition charge is disposed in the tube and the opposing end of the tube is provided with suitable means for holding the charge in place. First retaining means are secured to the cylindrical tube at a location spaced from the closed end, such retaining means extending outwarding from the tube and adapted to engage the first-noted surface of the nozzle. The invention is characterized by a second retaining means including means defining an annular groove on the cylindrical tube adjacent the closed end of same with a resilient annular gasket being located in the annular groove and projecting outwardly therefrom. This resilient gasket is adapted to firmly and sealingly engage the second surface, i.e. the expansion cone of the nozzle. The resilient annular gasket which is compressed against the diverging conical wall of the expansion nozzle not only provides an effective weather seal but also assists in fixing or positioning the igniter in the nozzle throat.

The resilient annular gasket is typically an elastomeric O-ring and this can be easily fitted into the annular groove provided on the igniter tube. The resulting igniter assembly is thus provided with an effective easily installed low cost lightweight weather seal with the weather seal having the added advantage of providing a convenient means for positively retaining the igniter in the desired position in the nozzle throat.

BRIEF DESCRIPTION OF THE VIEWS OF DRAWINGS

In drawings which illustrate an embodiment of the invention:

DETAILED DESCRIPTION OF PREFERRED EMBODIMENTS

Figure 1:
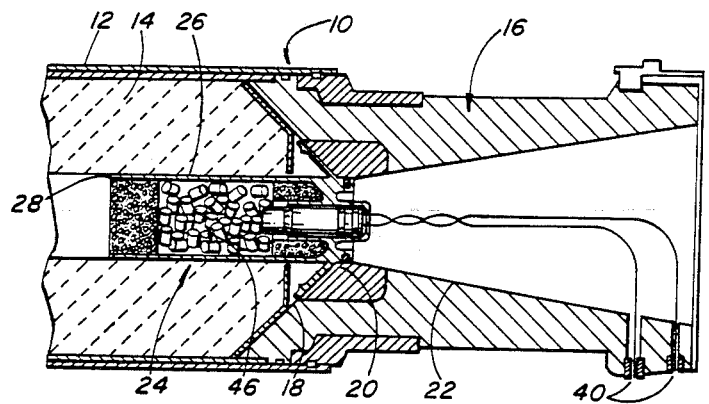
FIG. 1 is a longitudinal section view through the nozzle end of a rocket motor showing the improved igniter positioned in the nozzle throat.

Referring firstly to FIG. 1 there is shown a rear end portion of rocket motor 10, such rocket motor including a cylindrical housing 12 which serves to contain, among other things, a body of solid rocket propellant 14. A nozzle assembly 16 is secured to the rear end of housing 12, such nozzle assembly 16 defining an interior conical surface 18 which converges toward a nozzle throat 20, with a further conical surface 22 diverging outwardly away from throat 20 toward the rear end of the nozzle and defining a nozzle expansion cone. The throat portion 20 must be made from a material capable of resisting the extremely high temperatures encountered during operation.

The igniter 24 comprises a cylindrical tube 26 having an open end 28 and a closed end 30. The closed end 30 includes a tubular section 32 of reduced diameter. An electrically activated squib 34 is located in the reduced size section 32 and is held therein by a suitable adhesive such as that sold by the Armstrong Company of the United States under their part No. A34. The electrical leads 36 for the squib pass through a small aperture 38 in the closed end of the igniter tube. Leads 36 pass outwardly to suitable contacts 40 provided adjacent the exit end of nozzle assembly 16.

Figure 2:
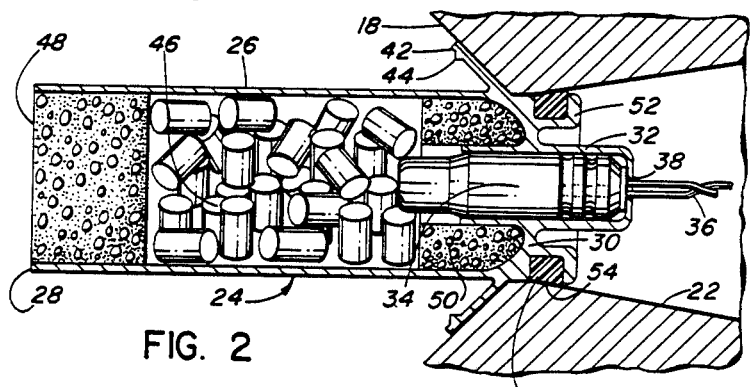
FIG. 2 is a longitudinal section of the improved igniter illustrating the weather seal-igniter positioning means.
Figure 3:
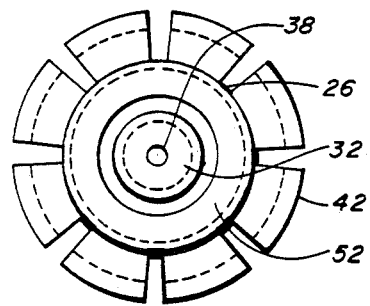
FIG. 3 is an end view of the igniter only.

As more fully described in the above-noted Canadian Patent No. 1,036,419, the igniter is provided with a number of equally spaced petal-shaped segments 42, the same extending outwardly at an angle to the central axis of the tube corresponding to the cone angle defined by nozzle surface 18. Segments 42 are integrally formed with the wall of tube 26 at locations spaced a short distance from the closed end 30 of the tube as illustrated in FIG. 2. Each segment 42 has a portion 44 which is thickened and pointed inwardly. From FIG. 2 it will be seen that the segments 42 assist in holding the igniter in place in that the segments 42 abut and fit snugly against the above-noted conical surface 18 of the nozzle. As more fully described in Canadian Patent No. 1,036,419 as the igniter is pushed out through the nozzle throat 30 during ignition, segments 42 bend inwardly and the thickened ends 44 are pushed against the wall of the tube thus causing the same to break up and collapse. As noted in the above-noted patent the fit of the igniter tube 26 in the nozzle throat is quite important in that if it is too tight it will be retained in the nozzle throat for an overly long period of time thus causing ignition over-pressure whereas if the tube is too loose there is early ejection of the igniter and poor flame spread during lightup. The igniter tube, including segments 42 formed integrally therewith, is preferably made from a material consisting of about 30% glass fibers and 70% nylon.

The preferred ignition charge 46 which is used in the igniter comprises boron potassium nitrate pellets typically referred to as BPN pellets. The desirable characteristics of these pellets are fully set forth in the above-noted patent. These pellets provide for a smooth rapid lightup of the solid propellant 14 contained within the rocket body and they burn at a rate such that there is little or no expulsion of partially burned pellets.

Further, as described in detail in the above U.S. Pat. No. 1,036,419, the open end 28 of igniter tube 26 is closed by a plug 48 of polyurethane foam which is bonded in place. This plug retains the pellet in the tube during handling of the igniter and the assembled rocket motor. Plug 48 also acts as a springy cushion for the BNP pellets thus preventing excessive movement and consequent powdering or cracking of them during periods of intense vibration. To further protect the pellets against powdering and cracking, there is also provided an annular foam cushion 50 which surrounds the squib 34, which, in addition to protecting the pellets, provides an alternative path for the squib flame on the rare occasions when, upon ignition the housing of the squib may rupture on the wall instead of the tip of the squib. Again, for further characteristics of the polyurethane foam, reference should be had to the patent noted above. The above patent should also be consulted for a further description of the electrical characteristics of a suitable squib and for further details generally of the ignition characteristics of typical igniters, rates of pressurization and so on.

Thus far, this description has set forth those characteristics which are common to the characteristics of the aft-end ignition system described in Canadian Patent No. 1,036,419. Reference will now be had to the weather seal arrangement which characterizes the present invention.

With particular reference to FIG. 2 it will be seen that the closed end 30 of igniter tube 26 is further provided with an extended annular portion 52 disposed in spaced surrounding relation to the extended reduced size section 32. This annular portion 52 has an annular groove 54 provided therein which receives a O-ring seal 56. It will be seen from FIG. 2 that the width and bottom diameter of the O-ring groove 54 as well as the sectional dimensions of the O-ring 56 are chosen such that the O-ring is positioned to provide a good seal with the conical surface 22 of the rocket nozzle as well as acting to position the igniter 24 in the throat of the rocket nozzle. The inwardly directed force components arising from radial compression of the O-ring give rise to a good sealing effect, preventing moisture from passing between the nozzle throat and the igniter. Furthermore, since the O-ring is pressing against conical surface 22, axially directed force components are generated thus causing segments 42 to be held in close abutting relation with conical nozzle surface 18.

During the course of assembly of the rocket motor, the O-ring 56, coated with a thin layer of suitable lubricant, is stretched over the closed end of the igniter until it snaps into the groove 54 provided for it. The complete igniter assembly 24 is then simply pressed into the throat 20 of the nozzle until the igniter's petals or segments 42 press against the conical surface 18. At this point, the O-ring 56 has moved rearwardly beyond the point of minimum diameter of the throat and is bearing against the conical surface 22 of the expansion section of the nozzle thus effectively sealing the nozzle throat and snugly retaining the igniter 24 in position.

We claim:

1. A rocket motor including a nozzle having a throat, a first conical surface converging toward said throat and a second conical surface diverging away from the throat toward the rear or exit end of the motor, and an igniter comprising a tube having a closed end, the tube located in the nozzle throat with said closed end facing toward the exit end, an electrically activated igniter squib located in said tube at the closed end thereof, an ignition charge in the tube and means associated with the opposing end of said tube to hold the charge in place, first retaining means secured to said tube at a location spaced from said closed end and extending outwardly therefrom and engaging said first conical surface of the nozzle, second retaining means including means defining an annular groove on said tube adjacent said closed end and a resilient annular gasket located in said annular groove and projecting outwardly therefrom and firmly and sealingly engaging said second conical surface of the nozzle such that said gasket is under radial compression to provide the sealing effect, and said engagement with said second conical surface creating force components in the axial direction of the nozzle which bring said first retaining means into close abutting relation to said first conical surface thereby to securely position and retain the igniter in the nozzle throat.

2. The rocket motor according to claim 1 wherein said annular gasket is an O-ring of elastomeric material.

3. The rocket motor accoridng to claim 1 wherein said first retaining means includes a plurality of segments extending outwardly from the tube from said location at an angle corresponding to the angle of convergence of the first surface, said closed end of the tube including a section of reduced size and said igniter squib being located in such reduced size section.

4. The rocket motor according to claim 1 wherein said first retaining means includes a plurality of segments extending outwardly from the tube from said location at an angle corresponding to the angle of convergence of the first surface, said closed end of the tube including a section of reduced size and said igniter squib being located in such reduced size section, the segments being of such a flexibility and such a strength that during detonation of the squib the igniter is first held in place and is thereafter allowed to move thus bending the segments inwardly to break the tube and initiate collapse and ejection of the igniter from the rocket in pieces.

5. The rocket motor according to claim 1 wherein said type is cylindrical.

6. A rocket motor including a nozzle having a throat, a first conical surface converging toward said throat and a second conical surface diverging away from the throat toward the rear end of the motor, and an igniter comprising a tube having a closed end, the tube located in the nozzle throat with said closed end facing toward the rocket rear end, an igniter and an ignition charge in the tube and means associted with the tube to hold the charge in place, first retaining means secured to said tube at a location spaced from said closed end and extending outwardly therefrom and engaging said first conical surface of the nozzle, second retaining means including means defining an annular groove on said tube adjacent said closed end and a resilient annular gasket located in said annular groove and projecting outwardly therefrom and firmly and sealingly engaging said second conical surface of the nozzle, said annular gasket being compressed by virtue of its contact with said conical surface with such compression giving rise to firm sealing engagement between the second conical surface and the annular gasket and between the latter and the annular groove of the igniter, said compression of said annular gasket against said second conical surface also giving rise to axially directed force components which tend to hold the first retaining means in close engagement with the first conical surface of the nozzle thereby to position and secure the igniter in the nozzle throat.

7. The motor of claim 6 wherein said gasket comprises an O-ring.

* * * * *